United States Patent
Kraner et al.

(10) Patent No.: US 10,808,790 B2
(45) Date of Patent: *Oct. 20, 2020

(54) VIBRATION ISOLATION SYSTEM

(71) Applicant: Technical Manufacturing Corporation, Peabody, MA (US)

(72) Inventors: Emil Kraner, Swampscott, MA (US); Antonio Lopes, Salem, MA (US); Justin Nealey, North Andover, MA (US)

(73) Assignee: Technical Manufacturing Corporation, Peabody, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,428

(22) Filed: Dec. 27, 2018

(65) Prior Publication Data
US 2019/0234478 A1 Aug. 1, 2019

Related U.S. Application Data

(63) Continuation of application No. 14/871,779, filed on Sep. 30, 2015, now Pat. No. 10,184,539.

(60) Provisional application No. 62/058,012, filed on Sep. 30, 2014.

(51) Int. Cl.
*F16F 7/10* (2006.01)

(52) U.S. Cl.
CPC .................. *F16F 7/1011* (2013.01)

(58) Field of Classification Search
CPC ...... F16F 15/022; F16F 15/027; F16F 7/1005; F16F 7/1011; B60G 2202/32; B60G 2202/25
See application file for complete search history.

(56) References Cited

U.S. PATENT DOCUMENTS

| 4,796,873 A | 1/1989 | Schubert |
| 5,265,704 A | 11/1993 | Landesfeind |
| 5,433,422 A | 7/1995 | Ross et al. |

(Continued)

FOREIGN PATENT DOCUMENTS

| JP | H05-340444 A | 12/1993 |
| JP | H11-297587 A | 10/1999 |

(Continued)

OTHER PUBLICATIONS

International Search Report and Written Opinion for International Application No. PCT/US2009/051845, dated Sep. 17, 2009.

(Continued)

*Primary Examiner* — Xuan Lan Nguyen
(74) *Attorney, Agent, or Firm* — Wolf, Greenfield & Sacks, P.C.

(57) ABSTRACT

Apparatus and methods to reduce unwanted motion in a payload of a precision instrument are described. The payload may be supported by an intermediate mass. A feedback signal based upon sensed motion of the intermediate mass may be applied to an intermediate-mass actuator arranged to drive the intermediate mass. Additionally, a feedforward signal may be applied to a payload actuator arranged to drive the payload and used to suppress unwanted motion of the payload. The feedforward signal may be derived from a source within the apparatus or external to the apparatus that would otherwise cause unwanted motion of the payload.

21 Claims, 6 Drawing Sheets

(56) References Cited

U.S. PATENT DOCUMENTS

| | | |
|---|---|---|
| 5,505,282 A | 4/1996 | Olgac |
| 5,645,260 A | 7/1997 | Falangas |
| 5,660,225 A | 8/1997 | Saffron |
| 5,660,255 A | 8/1997 | Schubert et al. |
| 5,823,307 A | 10/1998 | Schubert et al. |
| 5,884,736 A | 3/1999 | Burdisso et al. |
| 5,975,508 A | 11/1999 | Beard |
| 6,032,770 A | 3/2000 | Alcone et al. |
| 6,193,206 B1 | 2/2001 | Yasuda et al. |
| 6,354,576 B1 | 3/2002 | Jacobs et al. |
| 6,752,250 B2 | 6/2004 | Tanner |
| 6,808,051 B2 | 10/2004 | Warmerdam |
| 7,051,588 B1 | 5/2006 | Maltby |
| 7,571,793 B2 | 8/2009 | Warmerdam et al. |
| 7,665,708 B2 | 2/2010 | Stothers et al. |
| 7,726,452 B2 | 6/2010 | Kraner |
| 7,886,317 B2 | 2/2011 | Chang et al. |
| 8,899,393 B2 | 12/2014 | Kraner et al. |
| 9,353,824 B2 | 5/2016 | Kraner et al. |
| 9,665,108 B2 | 5/2017 | Nawata |
| 10,184,539 B2 | 1/2019 | Kraner et al. |
| 2002/0104950 A1 | 8/2002 | Mayama |
| 2006/0119026 A1 | 6/2006 | Ryaboy et al. |
| 2006/0272910 A1 | 12/2006 | Kraner |
| 2007/0273074 A1 | 11/2007 | Mizuno et al. |
| 2009/0180092 A1 | 7/2009 | Butler et al. |
| 2010/0030384 A1 | 2/2010 | Kraner et al. |
| 2013/0328253 A1 | 12/2013 | Kraner et al. |
| 2014/0209779 A1 | 7/2014 | Kropp et al. |
| 2015/0084249 A1 | 3/2015 | Kraner et al. |
| 2016/0091047 A1 | 3/2016 | Kraner et al. |
| 2019/0078643 A1 | 3/2019 | Kraner et al. |

FOREIGN PATENT DOCUMENTS

| | | |
|---|---|---|
| JP | 2000-027929 A | 1/2000 |
| JP | 2005-106272 A | 4/2005 |
| JP | 2011-530047 A | 12/2011 |
| WO | WO 2005/121901 A1 | 12/2005 |
| WO | WO 2010/014547 A1 | 2/2010 |
| WO | WO 2011/115488 A1 | 9/2011 |

OTHER PUBLICATIONS

International Search Report and Written Opinion for International Application No. PCT/US2013/043001, dated Sep. 25, 2013.
International Preliminary Report on Patentability for International Application No. PCT/US2013/043001, dated Dec. 9, 2014.
International Search Report and Written Opinion for International Application No. PCT/US2017/022532, dated Jul. 13, 2017.
International Preliminary Report on Patentability for International Application No. PCT/US2017/022532, dated Sep. 27, 2018.
International Search Report and Written Opinion for International Application No. PCT/US2018/000146, dated Dec. 14, 2018.
U.S. Appl. No. 16/638,073, Kordunsky et al., filed Feb. 10, 2020.
International Preliminary Report on Patentability for International Application No. PCT/US2018/000146, dated Feb. 27, 2020
U.S. Appl. No. 16/638,073, filed Feb. 10, 2020, Kordunsky et al.
PCT/US2018/000146, Feb. 27, 2020, International Preliminary Report on Patentability.

VIBRATION ISOLATION SYSTEM

RELATED APPLICATIONS

This application is a continuation of U.S. patent application Ser. No. 14/871,779, titled "Vibration Isolation System," filed Sep. 30, 2015, which claims priority to U.S. provisional application Ser. No. 62/058,012, titled "Vibration Isolation System," filed Sep. 30, 2014, which is hereby incorporated by reference in its entirety.

BACKGROUND

Technical Field

The technology relates to an active vibration isolation system that uses feedback and feedforward control to reduce unwanted motion at a supported payload.

Discussion of the Related Art

Precision instruments that are used in various areas of technology (e.g., integrated circuit fabrication, metrology, various areas of microscopy, precision medical instruments etc.) benefit from isolation of ambient sources of noise that can couple unwanted motion (e.g., vibrations, impulses, etc.) into a precision instrument. In some cases, the instruments need to be vibrationally isolated to an extent where mechanical motions executed by an instrument are controllable to micrometer-scale dimensions or less in short periods of time, such as in optical steppers used for integrated circuit fabrication, atomic-force or optical microscopes, electron microscopes or electron-beam lithography tools, and read/write heads on memory devices. To achieve such performance, active vibration isolation systems may be employed between a precision instrument and a base which supports the instrument.

SUMMARY

Apparatus and methods for reducing unwanted motion of a precision instrument are described. According to some embodiments, a vibration isolation system may comprise a payload supported by an intermediate mass. The payload may be a precision instrument. The intermediate mass may be configured to be supported above a base. The system may further include an intermediate-mass actuator arranged to connect between the intermediate mass and the base, and a payload actuator configured to be connected between the payload and the base. An electromechanical feedback circuit may be included to suppress unwanted motion of the intermediate mass. Additionally, an electromechanical feedforward circuit may be included to suppress unwanted motion of the payload. The feedback and feedforward circuits can suppress unwanted motion in a precision instrument that might otherwise occur due to dynamic forces acting on the precision instrument that are from sources external and internal to the precision instrument. According to some embodiments, a feedforward circuit can accelerate the rate at which unwanted motion of the payload is suppressed.

According to some embodiments, a vibration isolation system for suppressing unwanted motion of a payload may comprise an intermediate mass, a first intermediate-mass actuator coupled to the intermediate mass, a first feedback circuit coupled to the first intermediate-mass actuator, a first payload actuator arranged to couple to the payload, and a first feedforward circuit coupled to the first payload actuator.

The system may further include one or more first springs connected to the intermediate mass and one or more second springs having spring constants different from spring constants of the first springs and being connected to the intermediate mass. In some aspects, a first spring constant for the one or more first springs is at least one order of magnitude greater than a second spring constant for the one or more second springs.

Methods for operating a vibration isolation system having feedback and feedforward circuits are also contemplated. In some embodiments, a method of suppressing unwanted motion of a payload may comprise acts of operating a first feedback circuit to suppress unwanted motion in a first direction of an intermediate mass that is coupled to the payload, and operating a first feedforward circuit to suppress unwanted motion in the first direction of the payload. A method may further include supporting approximately all the weight of the payload and intermediate mass with one or more first springs connected between the intermediate mass and a base, and supporting the payload above the intermediate mass with one or more second springs connected between the payload and the intermediate mass, wherein a spring constant of the one or more second springs is at least an order of magnitude less than a spring constant of the one or more first springs.

The foregoing summary is provided by way of illustration and is not intended to be limiting.

BRIEF DESCRIPTION OF DRAWINGS

The skilled artisan will understand that the figures, described herein, are for illustration purposes only. It is to be understood that in some instances various aspects of the embodiments may be shown exaggerated or enlarged to facilitate an understanding of the embodiments. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1:
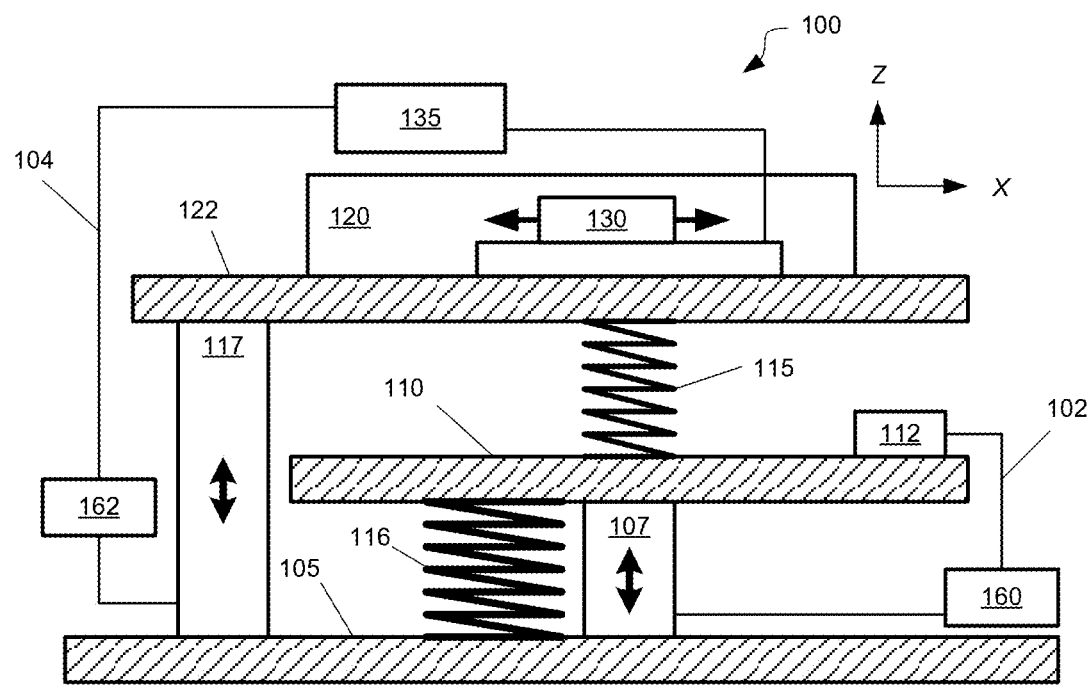
FIG. 1 depicts a vibration isolation system, according to a first embodiment.

Aspects, embodiments, and features of the present teachings can be more fully understood from the following description in conjunction with the accompanying drawings.

DETAILED DESCRIPTION

The microfabrication, medical, nanotechnology, and semiconductor industries continue to develop challenging demands for vibration isolation in precision devices and equipment used in these industries. Vibration isolation typically requires suppression of dynamic forces that would otherwise perturb the precision equipment and impair its performance. In the case of semiconductor manufacturing where minimum feature sizes continue to shrink well below 100 nm, unwanted equipment motion can the ruin patterning accuracy of a lithography tool, for example. Therefore, it is important to suppress unwanted motion to the sub-micron or even sub-100-nm level in precision instruments.

In some cases, dynamic forces that perturb precision equipment may be external to the equipment, couple into the equipment (e.g., through a base or feed lines to the equipment), and cause unwanted motion of the equipment. The inventors have recognized and appreciated that precision instruments can be located in environments where there may be multiple sources causing the unwanted motion. Some sources may be external to the precision equipment, and some sources may originate internally to the precision equipment. For example, the inventors have realized that increasing wafer sizes in the semiconductor industry requires larger and heavier wafer-positioning stages on semiconductor equipment that is typically vibrationally-isolated, such as an optical stepper. The inventors have recognized and appreciated that some methods of vibration isolation that employ active feedback may be used to suppress unwanted motion arising from sources external to a precision instrument (e.g., motion of a floor on which the instrument rests, acoustic perturbations, etc.), but have found that such methods may not rapidly reduce unwanted motion that originates from one or more sources within the precision instrument. Examples of unwanted motion from sources within a precision instrument may include unwanted ringing or oscillating motion associated with mechanical motion from motors or moving platforms mounted within or on the precision instrument. The inventors have recognized and appreciated that unwanted motion arising from internal or predictable sources may be suppressed rapidly using feedforward systems and techniques.

The inventors have recognized and appreciated that both feedback and feedforward systems may be used to suppress unwanted motion in a precision instrument that includes an intermediate mass and a payload. A feedback system may be employed to suppress unwanted motion in the intermediate mass from external sources to acceptable levels (e.g., sub-micron or sub-100-nm levels). A feedforward system may be additionally employed to suppress unwanted motion in the payload from internal or predictable sources. The feedback and feedforward systems may be decoupled from each other using a soft spring or soft mechanical coupling between the intermediate mass and payload. For example, the feedback and feedforward systems may operate substantially independently of each other to suppress unwanted motion arising from different sources, according to some embodiments.

FIG. 1 depicts a first embodiment of a vibration isolation system 100 that is configured to reduce vibrations and/or unwanted motion at a payload 120 of the system. A vibration isolation system may include a payload 120, a payload support 122, an intermediate mass 110, at least one payload spring 115, a payload actuator 117, at least one intermediate-mass spring 116, and at least one intermediate-mass actuator 107. According to some embodiments, a vibration isolation system may include several components at which unwanted motion is reduced (e.g., payload support 122 and payload 120 and intermediate mass 110). The intermediate mass and payload may be supported by a base 105. The base may be a frame, a floor, or other structure of a building, in some embodiments. In some cases, the base may be a metal frame, mass of concrete, and/or other material set in the earth.

In some implementations, coupling elements of different types (spring(s), damper(s), and actuator(s)) may be arranged between components of the system at which unwanted motion is reduced. According to some embodiments, one or more intermediate-mass actuators 107 may be coupled between the base 105 and intermediate mass 110. One or more payload springs 115 may be arranged to couple between the intermediate mass and the payload 120 or payload support. There may be one or more intermediate mass springs 116 coupled between the base 105 and intermediate mass 110. In some cases, the one or more intermediate mass springs may be stiff springs that are sized to support the majority or approximately all (e.g., 90% or more) of the mass of the intermediate mass 110 and payload 120. In some implementations, an intermediate-mass spring 116 may have a stiffness that is at least two orders of magnitude greater than a stiffness of a payload spring 115. In some cases, an intermediate-mass spring 116 may have a spring constant $k_{im}$ along its direction of compression that is at least one order of magnitude greater than a spring constant $k_p$ of a payload spring 115. One or more payload actuators 117 may be arranged to couple between the base 105 and the payload 120 or payload support 122. In some implementations, the intermediate-mass actuator(s) 107 and/or spring(s) may provide sufficient mechanical support for the masses of the intermediate mass and payload. According to some embodiments, one or more payload actuators 117 may provide no static support or negligible static support (e.g., less than 10%) for the mass of the payload.

In some embodiments, a mass of an intermediate mass may be between approximately 0.5 pound and approximately 20 pounds. In some implementations, a mass of the payload 120 may be between 40 pounds and approximately 10 tons. In some cases, a mass of an object moved by positioning equipment on the payload may be between approximately 40 pounds and approximately 500 pounds. As may be appreciated, the movement of a massive object on the payload may induce unwanted motion of the payload 120.

The terms "approximately" and "about" may be used to mean within ±20% of a target value (e.g., an explicitly stated value) in some embodiments, within ±10% of a target value in some embodiments, within ±5% of a target value in some embodiments, and yet within ±2% of a target value in some embodiments. The terms "approximately" and "about" also include the target value, so that a ranges expressed as "between approximately A and approximately B" may also be expressed as "between A and B" and a value stated as "approximately A" may also be expressed as "A".

In some implementations, a sensor 112 may be arranged to detect a first motion of the intermediate mass 110. The sensor 112 may comprise one or more accelerometers configured to sense motion in one or more directions. According to some embodiments, the sensor may comprise at least one servo-accelerometer or any other vibration sensor, such as a geophone. An example accelerometer that may be used for sensor 112 is accelerometer model 714A7101 available from Instantel of Ottawa, Canada.

The first motion sensed by sensor 112 may be from a first source of motion (e.g., a source external to the system 100 that couples a disturbance into the intermediate mass 110 from the base 105, for example). A feedback controller 160 may receive a signal from the sensor 112 and drive the actuator 107 to reduce or cancel the first motion sensed with the sensor 112. Examples of using feedback to reduce unwanted motion in a vibration isolation system can be found in U.S. Pat. No. 4,796,873, which is incorporated by reference in its entirety. For example, for a first axis of motion, the sensor 112 may sense a motion z(t) in the Z direction, and provide a feedback signal to drive the actuator 107 to oppose the sensed motion.

Figure 2:
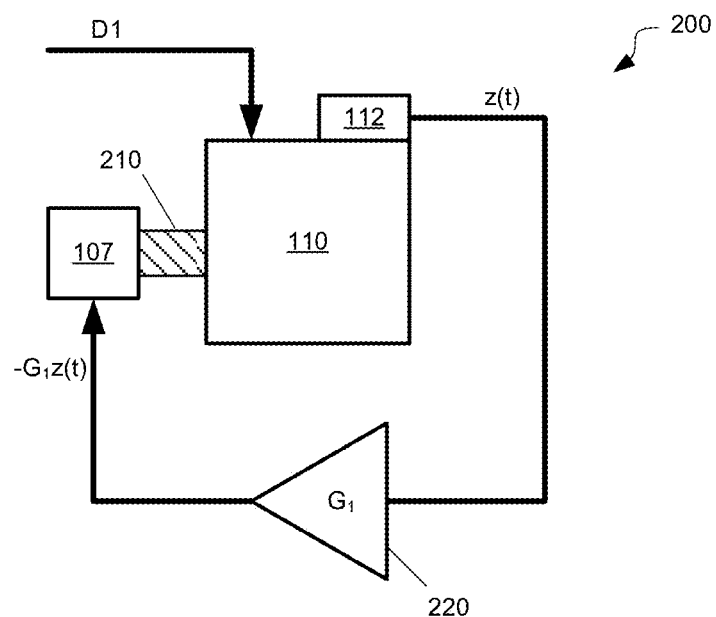
FIG. 2 depicts an electromechanical feedback circuit, according to some embodiments.

In some implementations, a feedback controller 160 may be part of or comprise an electromechanical feedback circuit 200, an example of which is depicted in FIG. 2. The feedback circuit 200 may be configured to suppress unwanted motion of the intermediate mass 110 due to external sources. The external source or sources may apply a dynamic force, or disturbance D1, to the intermediate mass 110. Motion induced by the disturbance D1 may be sensed by sensor 112, and converted to an electrical signal z(t) that is representative of the unwanted motion. The signal may be processed using a PID controller or other suitable controller (not shown), amplified electronically by an amplifier 220, inverted, and applied to actuator 107. In some embodiments, the signal may be applied to two or more actuators 107 in parallel. The feedback loop may further include a phase shifter (not shown) and frequency filter (not shown). The phase shifter and frequency filter may be used to set an operating loop bandwidth of the feedback circuit. The amount of gain $G_1$ of the amplified signal may be adjusted manually or via computer control. According to some embodiments, the actuator is mechanically coupled to the intermediate mass by a linkage 210, and may drive the intermediate mass 110 in a direction to oppose the unwanted motion.

Referring again to FIG. 1 and according to some embodiments, one or more payload actuators 117 may be coupled between the base 105 and the payload 120 or a payload support 122. A payload actuator 117 may be configured to cancel unwanted payload motions that might otherwise arise from sources internal to the system (e.g., motors or positioning stages mounted on the payload), or predictable sources external to the system (e.g., a building elevator drive signal). In some implementations, the payload 120 may include a second source causing unwanted motion. For example, the second source of unwanted motion may be a motorized positioning stage 130 that is used to position components on the payload (e.g., a wafer chuck of an optical stepper that moves a wafer between exposures). The positioning stage 130 may be driven by a motion controller 135. The positioning stage may be massive (e.g., weighing tens of pounds or more) and include motors which drive an object within or on the payload 120.

To reduce unwanted motion of the payload 120 caused by a second source or sources of motion, an electromechanical feedforward circuit may be arranged to drive the payload actuator 117 to reduce or cancel the unwanted motion. In some embodiments, a signal for driving the payload actuator may be derived from a controlling source of the second motion, such as the motion controller 135. The signal may be processed and provided to a feedforward controller 162, and used to drive the payload actuator 117 so as to reduce the unwanted motion of the payload 120.

Figure 3:
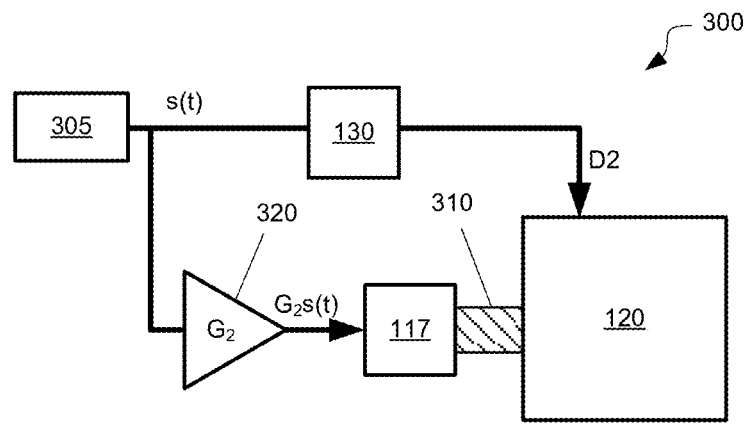
FIG. 3 depicts an electromechanical feedforward circuit, according to some embodiments.

According to some embodiments, a feedforward controller 162 may be part of or comprise an electromechanical feedforward circuit, an example of which is depicted in FIG. 3. In some embodiments, a controller 305 (e.g., a motion controller for a positioning stage, a motor controller, etc.) may provide a signal s(t) to operate a mechanical element on the payload 120 or in the vicinity of the precision equipment. Operation of the mechanical element, without feedforward cancellation, may produce a disturbance D2 that induces unwanted motion of the payload. A portion of the control signal s(t) may be processed (e.g., using a proportional controller or other suitable controller, not shown) and sent to an amplifier 320, amplified by an amount $G_2$, and applied to the payload actuator 117. The amount of gain $G_2$ may be adjustable and set manually or by computer control. According to some embodiments, the amount of gain $G_2$ in a feedforward circuit may be greater than an amount of gain $G_1$ in a feedback circuit for a vibration isolation system 100. The payload actuator 117 may drive the payload 120 through mechanical linkage in a direction to oppose the unwanted motion. In some embodiments, a phase shifter (not shown) and/or frequency filter (not shown) may be included in the feedforward path between the controller 305 and actuator 117.

In some embodiments, a bandwidth and/or operating frequency range of the feedforward circuit 300 may overlap with a bandwidth and or operating frequency range of the feedback circuit 200. For example, the feedback circuit may operate over a frequency range between approximately 0.5 Hz and approximately 300 Hz, and the feedforward circuit may operate over a frequency range between approximately 2 Hz and approximately 100 Hz. In some implementations, an operating frequency range for the feedforward circuit may be higher or lower than an operating frequency range for the feedback circuit, and may or may not overlap with the operating frequency range of the feedback circuit. An operating frequency range for the feedback and feedforward circuits may be a range of frequencies within which each circuit suppresses its respective unwanted motion.

In some embodiments, a stiffness of the one or more payload springs 115 is at least one to two orders of magnitude less than a stiffness of the one or more intermediate-mass springs 116. Alternatively, a spring constant of the one or more payload springs 115 is at least three to ten times less than a spring constant of the one or more intermediate-mass springs 116. A spring constant of a plurality of springs (e.g., one or more payload springs) may be a value determined from the springs added in parallel. Because of the relative softness of the payload spring(s), the operation of the feedback and feedforward circuits are substantially decoupled from one another, and can act substantially independently to suppress unwanted motion in the intermediate mass and payload, respectively. Accordingly, the operating bandwidths of the two circuits may overlap without the circuits interfering with each other.

According to some embodiments, a second source of unwanted motion may comprise one or a combination of sources. Signals from a combination of sources may be added before being provided to the payload actuator 117. In some cases, a second source may be external to the payload. For example, the second source may comprise a nearby source generating acoustic or mechanical noise that couples directly to the payload 120 (e.g., an elevator that operates and transmits a vibration through the base, a loud air handler that generates an acoustic disturbance when activated). In some embodiments, the second source may comprise an electromagnetic motor that generates electromagnetic fields that may interact with a component on the payload 120 and cause unwanted motion in the payload. In some implementations, one or more signals from these sources may be provided to at least one feedforward circuit 300.

In operation, a feedback circuit and feedforward circuit can reduce unwanted motion at a payload to micrometer-scale or sub-micrometer-scale distances in less than one second in some embodiments, and less than one-half second in some embodiments. In some implementations, a feedback circuit and feedforward circuit can reduce unwanted motion at a payload to micrometer-scale or sub-micrometer-scale distances in less than ten seconds. A feedback circuit can contribute to stability of the intermediate mass 110 by cancelling dynamic forces from sources external to a precision equipment. Additionally, and substantially independently, a feedforward circuit 300 can suppress unwanted motion that might otherwise occur from dynamic forces arising internal to the precision equipment, in some implementations.

Figure 4A:
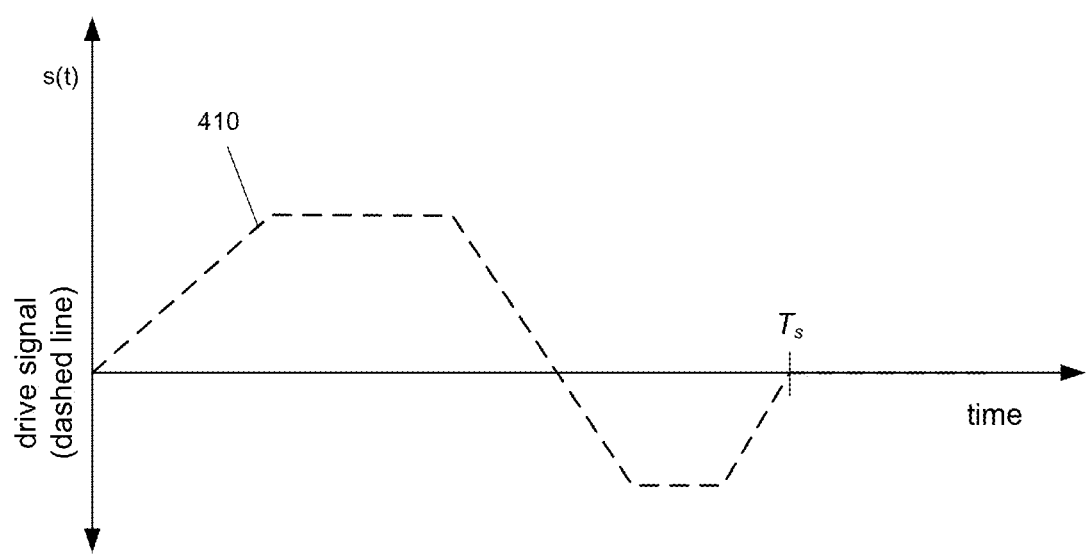
FIG. 4A is a depiction of a drive signal that may be applied to a positioning stage mounted on or in a payload, according to some embodiments.
Figure 4B:
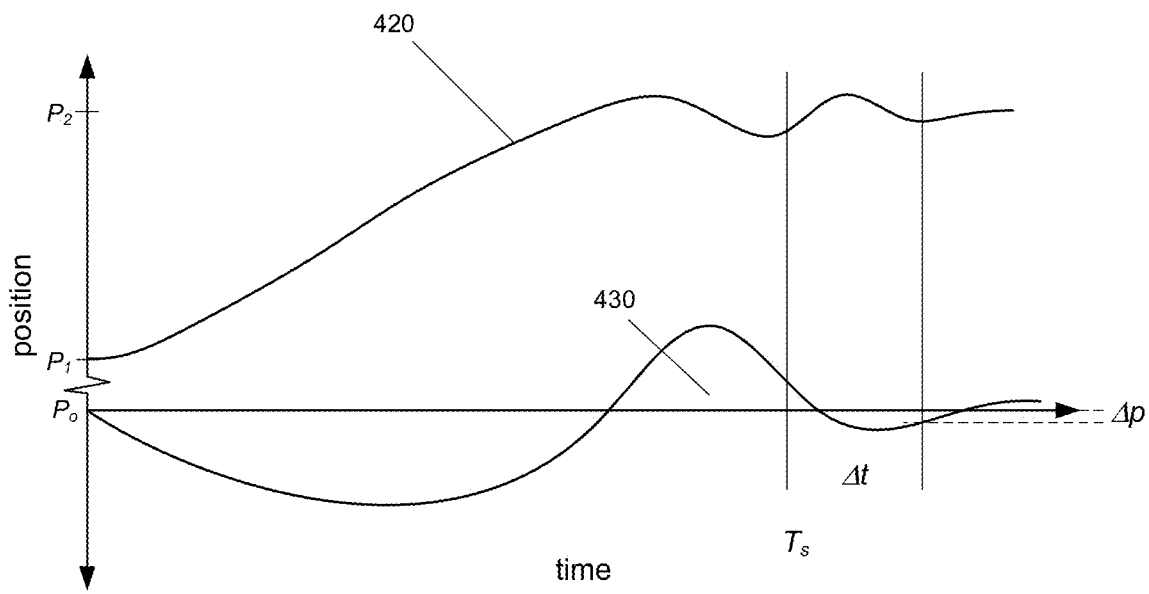
FIG. 4B is a plot generally depicting motion of a positioning stage's platform (curve 420) and resulting motion of a payload (curve 430), according to some embodiments.

By way of instruction, FIGS. 4A-4B depict graphically how unwanted motion at the payload may be reduced. The plot of FIG. 4A is an example of a driving signal 410 that may be applied to a positioning stage 130. For example, to move the stage's movable platform, a drive signal s(t) (e.g., voltage or current) may first increase in magnitude to accelerate the stage, remain stable for a period of time at a level of the stage's maximum acceleration, decrease in magnitude to decelerate the stage, remain constant for a second period of time, and then return to a zero level at a stopping time $T_s$. The resulting motion of the stage's movable platform, depicted in FIG. 4B may be as indicated by the curve 420. The stage's platform may move from a first position $P_1$ to a second position $P_2$, and eventually settle at the second position. In reality, the stage's platform may oscillate about the second position for a brief period of time, as indicated in the plot, before settling at the second position. As a result of the motion, the payload 120 may deviate from an original position $P_o$ as indicated by the plot 430, oscillate, and then settle back to a static position, which may be at or near $P_o$. After the drive signal 410 has terminated, both the platform and the payload 120 may oscillate for a period of time.

A figure of merit for a vibration isolation system is the extent Δp to which the payload settles to a static position within a time Δt after cessation of the drive signal 410. By employing a feedforward circuit 300 in addition to a feedback circuit 200, the inventors have improved this payload-settling figure of merit by a factor of about three in a precision equipment, such as an optical stepper. For example, in a system arranged as depicted in FIG. 1 in which a feedback circuit 200 is active and a feedforward circuit 300 is de-activated, the payload 120 was observed to settle to within one micron of its resting or static position within approximately 600 ms after termination of a drive signal to a stage 130. When the feedforward circuit 300 was activated in addition to the feedback circuit 200, the payload 120 was observed to settle to within one micron of its static position within approximately 200 ms after termination of the drive signal to the stage 130.

Figure 5:
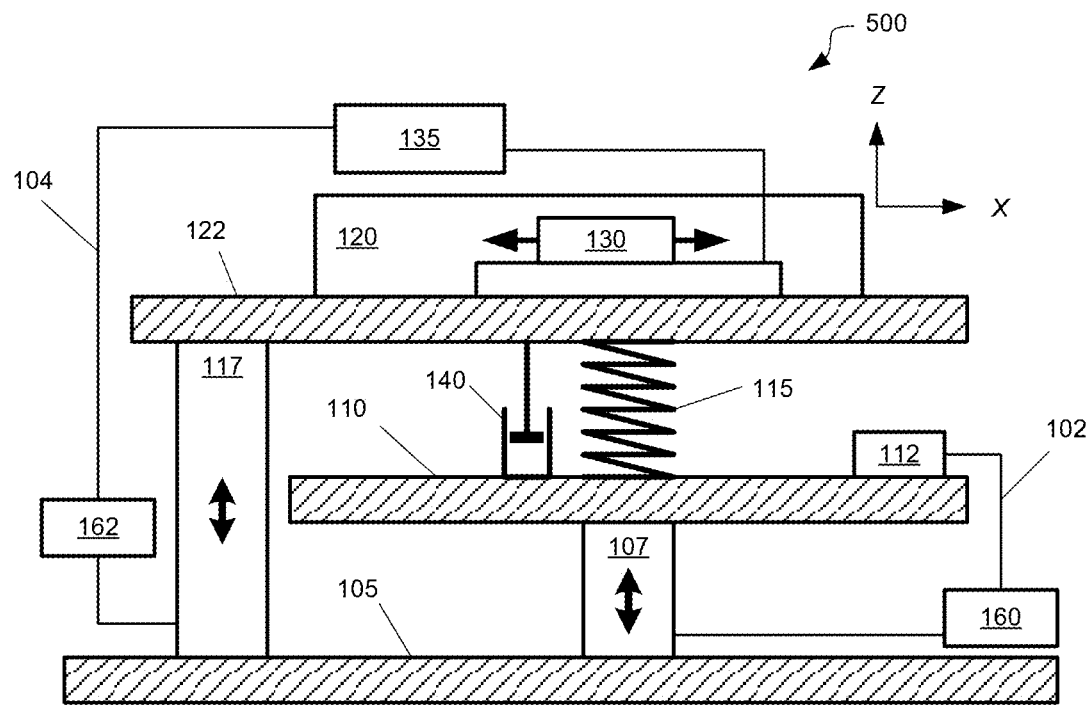
FIG. 5 depicts a vibration isolation system, according to a second embodiment.

FIG. 5 depicts an alternative embodiment of a vibration isolation system 500. In some cases, one or more actuators 107 may be stiff actuators (e.g., piezoelectric actuators that support approximately all the weight of the intermediate mass and payload), and there may not be an intermediate-mass spring 116 between the intermediate mass and the base. According to some embodiments, a damping element 140 may be arranged between the intermediate mass 110 and the payload 120 or payload support 122. It will be appreciated that a damping element 140 may be arranged between other components of the system. For example, a damping element 140 may be arranged between the intermediate mass 110 and the base 105, according to some embodiments. In some implementations, a damping element 140 may be arranged between the payload 120 or payload support 122 and the base 105. Additionally or alternatively, a stiff spring 116 may be arranged between other components of the system 200. For example, a stiff payload spring may be coupled between the payload 120 or payload support 122 and the base 105.

Figure 6:
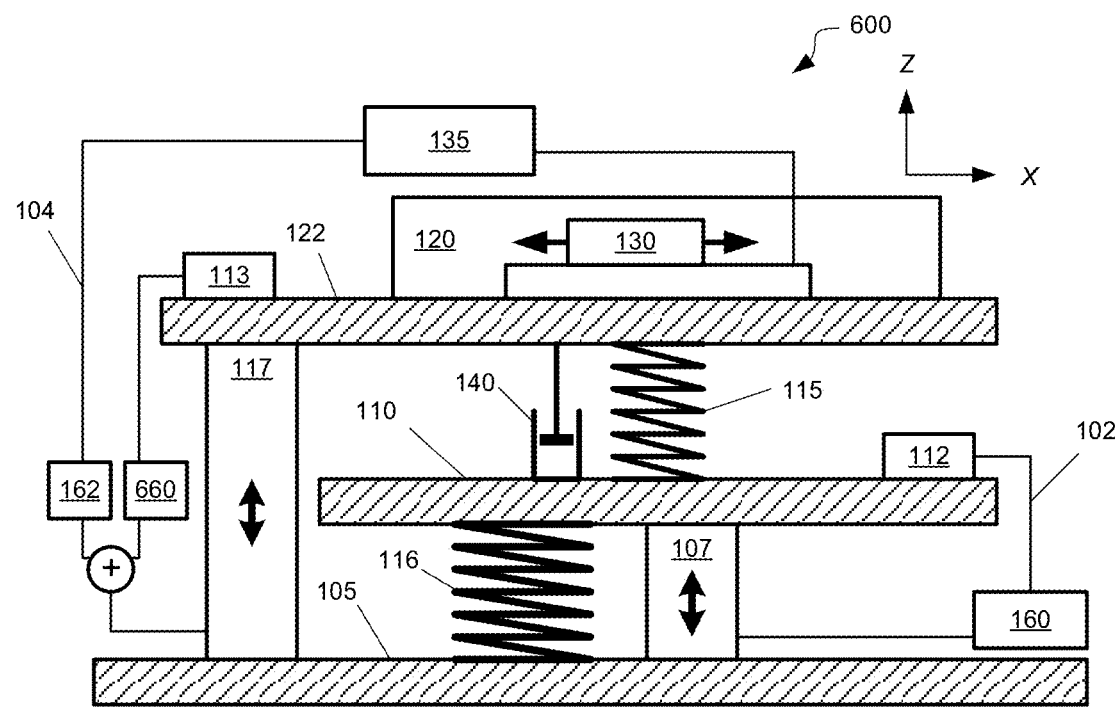
FIG. 6 depicts a vibration isolation system, according to a third embodiment.

FIG. 6 depicts another embodiment of a vibration isolation system 600. According to some embodiments, an intermediate-mass spring 116 may be coupled between the intermediate mass 110 and the base 105. In some implementations, the intermediate-mass spring 116 may be a stiffer spring, or a significantly stiffer spring, then the payload spring 115. In some cases, the intermediate-mass spring may have a spring constant $k_1$ that is at least two orders of magnitude greater than a spring constant $k_2$ of the payload spring 115. Additionally, the intermediate-mass spring 116 may relieve the majority of the load that would have been supported by the intermediate-mass actuator 107. In some implementations, the one or more intermediate-mass springs support 90% or more of the intermediate mass 110 and payload 120 and intervening coupling elements. Accordingly, the intermediate-mass actuator 107 may have a significantly smaller stiffness than the intermediate-mass spring 116. In some cases, the intermediate-mass actuator 107 and/or the payload actuator 117 may have approximately zero static stiffness, have a lower driving force, and be of lower cost than an actuator designed to support the full load, or a majority of the load, of the intermediate mass and/or payload. In some implementations, the one or more intermediate-mass actuators 107 and/or the payload actuators 117 may comprise voice coil drivers or electromagnetic drivers.

Any of the embodiments shown in FIG. 1, FIG. 5 and FIG. 6 may include a second sensor 113 that is arranged to detect motion of the payload 120. The second sensor 113 may be used in a second feedback loop to drive the payload actuator 117, according to some embodiments. For example, the second sensor 113 may detect unwanted motion of the payload 120 that is due to unknown sources, and provide a signal to a second feedback controller 660 that is used to cancel motion of the payload caused by the unknown sources. In some embodiments, a second sensor 113 and second feedback loop may be used to drive the payload actuator 117 in addition to the feedforward circuit 300.

In some implementations, the feedforward controller 162 may be used differently at different times in the system. For example, at a first time during an interval of stage movement and briefly after termination of the stage movement, the feedforward controller may receive a first signal from the stage controller 135 and output a signal to the payload actuator 117 based upon the first signal such that unwanted motion from stage movement is reduced. At a second time (e.g., after the stage has settled and remains still), the feedforward controller may receive a second signal from a second source and output a signal to the payload actuator 117 based upon the second signal such that unwanted motion from the second source is reduced. The second source may be from a different controller (e.g., an air handler motor or other apparatus that couples a disturbance directly to the payload via air or acoustic energy or through a supply line).

As noted above, there may be more than one type of coupling element (spring, damper, or actuator), or more than one combination of coupling elements, between components of a vibration isolation system arranged to suppress motion in any selected direction. For example and with reference to FIG. 1, there may be three, four, or more actuators and intermediate-mass springs arranged in parallel between the base 105 and intermediate mass 110. The multiple coupling elements or combination of coupling elements may be coupled at different locations across the intermediate mass for greater stability. In some embodiments, combinations of coupling elements between components of a vibration isolation system may be arranged in parallel or in serial.

Figure 7:
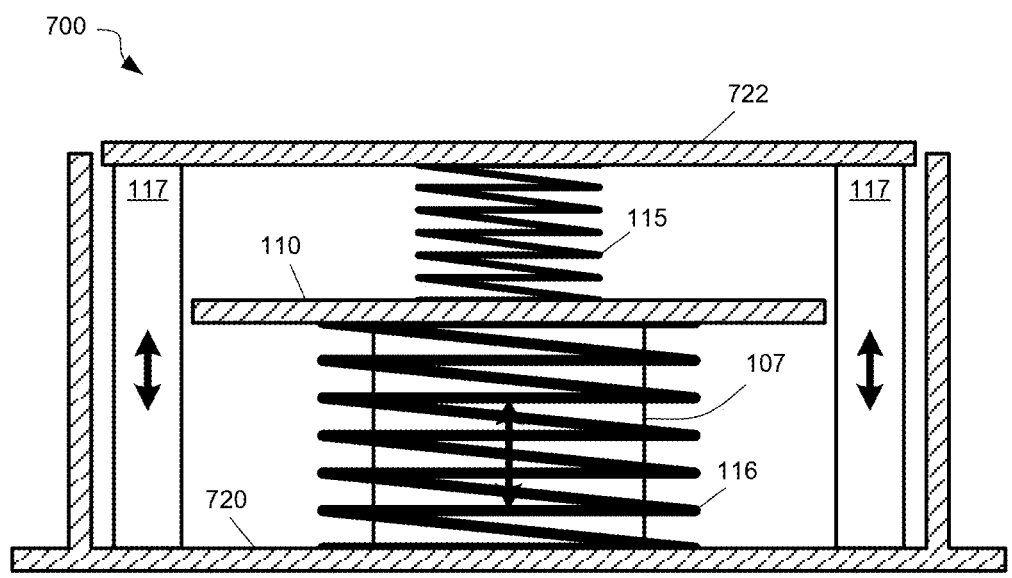
FIG. 7 depicts an assembly containing elements of a vibration isolation system, according to some embodiments.

In some implementations, one or more coupling elements may be packaged as a support leg for a payload. For example, an intermediate-mass actuator 107, intermediate mass 110, sensor 112, payload actuator 117, and payload support spring 115 may be assembled in a housing that is arranged to couple between a payload 120 and a base 105. Such an assembly may appear as depicted in FIG. 7, according to some embodiments. The assembly may include a bottom plate 720 configured to be attached to a base 105, and a payload support 722 configured to be attached to a payload 120.

Figure 8:
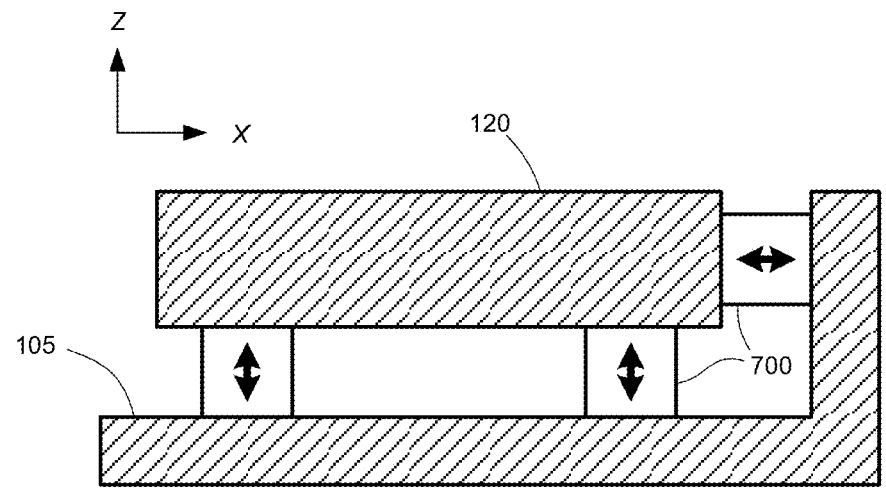
FIG. 8 depicts a vibration isolation system having multi-axis suppression of unwanted motion of a payload, according to some embodiments.

Although the above discussion depicts motion control in one direction in the drawings (e.g., the Z direction as indicated in the drawings), it will be appreciated that the techniques and apparatus may be applied to reduce unwanted motion in more than one direction, as depicted in FIG. 8. For example, the techniques and apparatus may be extended to two or three orthogonal directions as discussed in U.S. published patent application No. 2013/0328253, which is incorporated by reference in its entirety. For example, actuators 107, 117 may be coupled to the intermediate mass 110 and payload 120, respectively in X, Y and Z directions. Feedback 200 and feedforward circuits 300 may also be configured for suppressing unwanted motion in X, Y and Z directions. According to some embodiments, feedback circuits for orthogonal directions of motion may be decoupled and operate independently of each other. According to some embodiments, feedforward circuits for orthogonal directions of motion may be decoupled and operate independently of each other. In some implementations, a feedback or feedforward controller may activate more than one actuator. For example, a feedforward controller may activate two or more intermediate-mass actuators 107 coupled in parallel between a base 105 and intermediate mass.

EXAMPLES

A vibration isolation system for precision equipment was assembled to include feedback and feedforward circuits, as illustrated in FIG. 1. The vibration isolation system was designed to support an optical stepper (payload 120) having a motorized positioning stage. The mass of the load moved by the positioning stage was approximately 120 pounds. The mass of the payload was approximately 3000 pounds. The payload was supported above an intermediate may by a plurality of payload support springs. The intermediate mass was supported above a base by a plurality of intermediate-mass springs.

A feedback circuit was used to suppress unwanted motion of the intermediate mass that would otherwise couple to the intermediate mass through the base and intermediate-mass springs. An output from the feedback circuit was used to drive an intermediate mass actuator coupled between the intermediate mass and the base.

A feedforward circuit was used to suppress unwanted motion of the payload that would otherwise arise from motion of the positioning stage. An output from the feedforward circuit was used to drive a payload actuator coupled between the payload and the base.

Figure 9A:
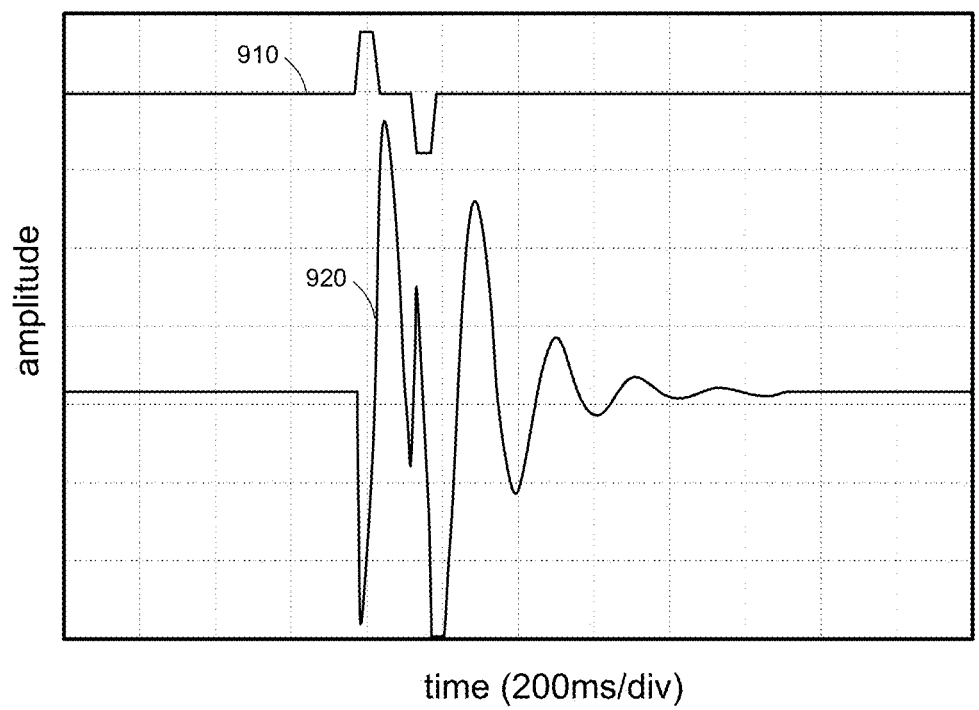
FIG. 9A illustrates a drive signal (curve 910) applied to a positioning stage of a payload in a vibration isolation system having no feedforward control, and the resulting acceleration (curve 920) of the payload.

FIG. 9A shows reproductions of two oscilloscope traces recorded for the vibration isolation system. The first trace 910 illustrates a drive signal applied to a positioning stage mounted on the payload. The second trace 920 represents acceleration of the payload that results from stage motion, even though the payload is isolated from floor vibration with a feedback circuit from the base through an intermediate mass, intermediate mass springs, and payload springs. A feedforward circuit was not employed during the stage motion. The motion of the stage disturbs the payload, and it takes approximately 600-800 ms for the payload to settle to within about one micron of its initial position after termination of stage motion.

Figure 9B:
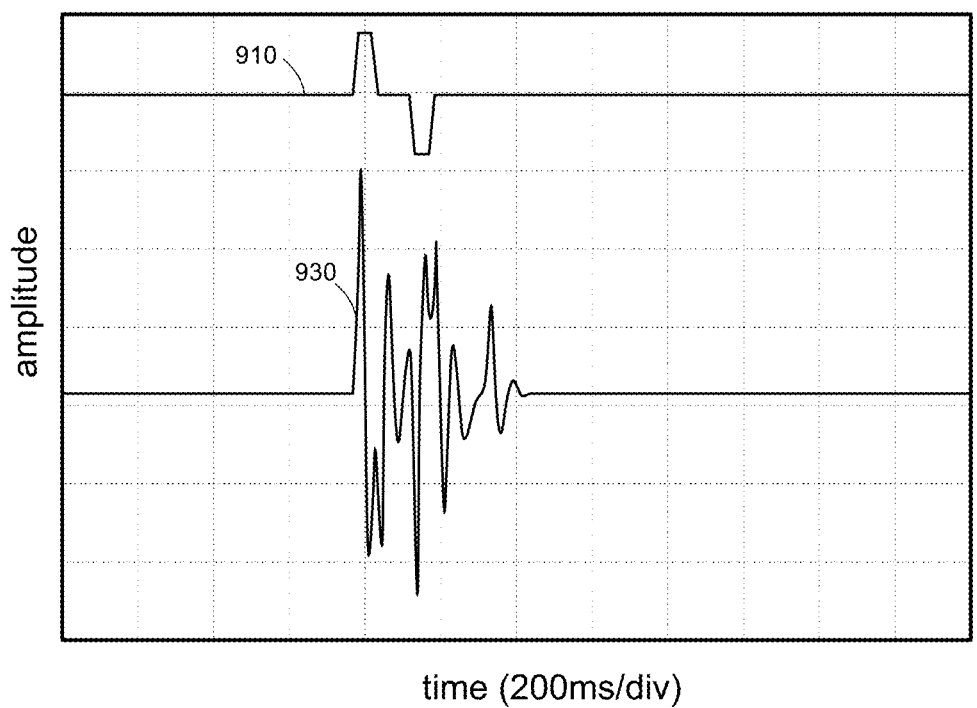
FIG. 9B illustrates the same drive signal (curve 910) applied to a positioning stage of a payload in the same vibration isolation system having feedforward control, and the resulting acceleration (curve 930) of the payload.

FIG. 9B shows reproductions of two oscilloscope traces recorded for the same vibration isolation system operating with the same stage motion, except that a feedforward circuit is now employed to suppress unwanted motion of the payload. The top trace 910 again represents a drive signal applied to the positioning stage of the payload. The second trace 930 again represents acceleration of the payload that results from stage motion, now with feedforward control applied. The feedforward signal applied to the payload actuator was proportional to the drive signal applied to the positioning stage. In this case, the time for the payload to settle to within about one micron of its initial position is approximately 200 ms after termination of the stage motion.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting.

What is claimed is:

1. A vibration isolation system for suppressing unwanted motion of a payload, the vibration isolation system comprising:
    an intermediate mass;
    a first intermediate-mass actuator coupled to the intermediate mass and arranged to receive a first signal from a first feedback circuit; and
    a first payload actuator arranged to couple to the payload or a payload support and provide negligible static support for a mass of the payload, wherein the first payload actuator is adapted to drive the payload or the payload support to reduce or cancel unwanted motion of the payload in response to a signal from a first feedforward circuit.

2. The vibration isolation system of claim 1, further comprising:
one or more first springs connected to the intermediate mass; and
one or more second springs having spring constants different from spring constants of the first springs and configured to couple between the intermediate mass and the payload.

3. The vibration isolation system of claim 2, wherein the one or more first springs are configured to support a majority of a weight of the intermediate mass and the payload.

4. The vibration isolation system of claim 2, wherein the first intermediate-mass actuator comprises a voice coil driver or electromagnetic driver.

5. The vibration isolation system of claim 1, arranged to support at least a portion of an optical stepper or lithography tool.

6. The vibration isolation system of claim 1, arranged to support at least a portion of a microscope or precision medical instrument.

7. The vibration isolation system of claim 1, wherein the intermediate mass and first intermediate-mass actuator are assembled within a housing.

8. The vibration isolation system of claim 7, further comprising:
a payload support;
a bottom plate;
one or more first springs connected between the intermediate mass and the bottom plate; and
one or more second springs connected between the payload support and the intermediate mass, wherein the first intermediate-mass actuator connects to the bottom plate.

9. The vibration isolation system of claim 8, wherein the first payload actuator is assembled within the housing and connects to the bottom plate.

10. The vibration isolation system of claim 1, wherein the intermediate mass weighs between 10 pounds and 500 pounds.

11. The vibration isolation system of claim 1, further comprising a sensor arranged to detect motion of the intermediate mass and output a signal to the first feedback circuit.

12. The vibration isolation system of claim 1, further comprising a sensor arranged to detect motion of the payload or a payload support and output a signal to a second feedback circuit, wherein the first payload actuator is further adapted to drive the payload or the payload support to reduce or cancel unwanted motion in response to a signal from the second feedback circuit.

13. The vibration isolation system of claim 1, further comprising:
a second intermediate-mass actuator coupled to the intermediate mass in a direction orthogonal to the first intermediate-mass actuator.

14. The vibration isolation system of claim 1, further comprising:
a second payload actuator arranged to couple to the payload in a direction orthogonal to the first payload actuator.

15. The vibration isolation system of claim 1, further comprising:
the first feedback circuit having a first gain value; and
the first feedforward circuit having a second gain value.

16. The vibration isolation system of claim 15, wherein the second gain value is greater than the first gain value.

17. The vibration isolation system of claim 15, wherein the first feedback circuit is arranged to suppress unwanted motion of the intermediate mass and the first feedforward circuit is arranged to receive a signal originating from the payload.

18. The vibration isolation system of claim 15, further comprising:
one or more first springs connected to the intermediate mass; and
one or more second springs configured to couple between the intermediate mass and the payload, wherein a first spring constant for the one or more first springs is at least one order of magnitude greater than a second spring constant for the one or more second springs, and wherein the one or more second springs provide a soft mechanical coupling between the payload and the intermediate mass that decouples the first feedback circuit from the first feedforward circuit.

19. The vibration isolation system of claim 15, further comprising:
a second intermediate-mass actuator coupled to the intermediate mass in a direction orthogonal to the first intermediate-mass actuator; and
a second feedback circuit coupled to the second intermediate-mass actuator.

20. The vibration isolation system of claim 15, further comprising:
a second payload actuator arranged to couple to the payload in a direction orthogonal to the first payload actuator; and
a second feedforward circuit coupled to the second payload actuator.

21. The vibration isolation system of claim 15, wherein the first feedback circuit has a first operating bandwidth in which a loop gain is greater than 1 and the first feedforward circuit has a second operating bandwidth for which unwanted motion of the payload is attenuated by the first feedforward circuit, and wherein the first operating bandwidth and second operating bandwidth overlap in frequency.

* * * * *